J. T. COSTELLO.
SHOCK ABSORBER.
APPLICATION FILED DEC. 5, 1910.

1,002,040.

Patented Aug. 29, 1911.
2 SHEETS—SHEET 1.

WITNESSES

INVENTOR
John T. Costello
By J. C. N. Cooke
Attorney.

J. T. COSTELLO.
SHOCK ABSORBER.
APPLICATION FILED DEC. 5, 1910.
1,002,040.
Patented Aug. 29, 1911.
2 SHEETS—SHEET 2.
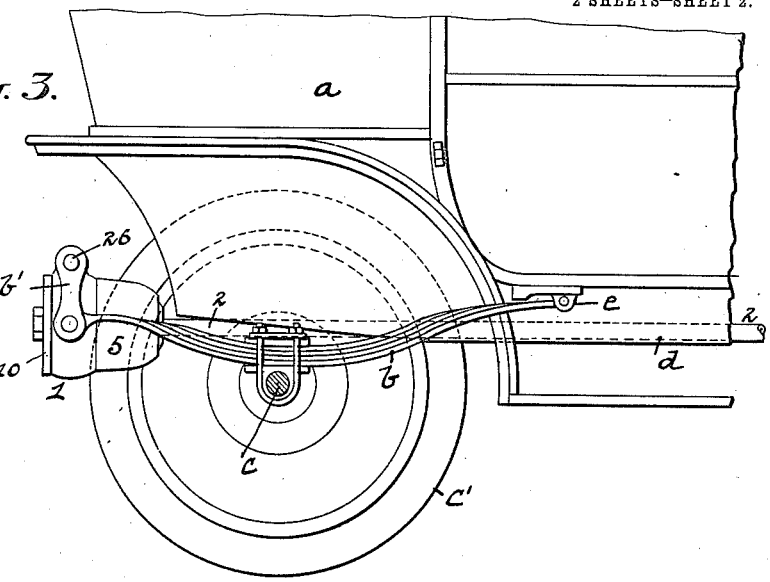
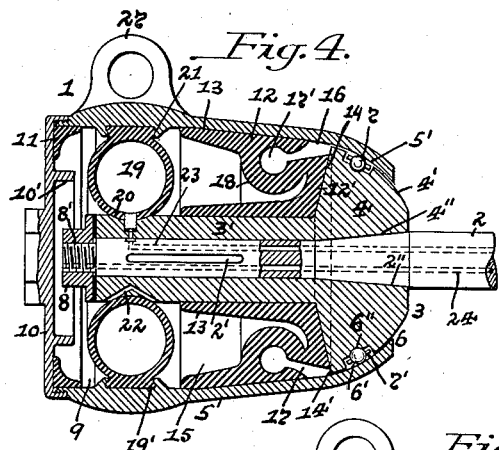
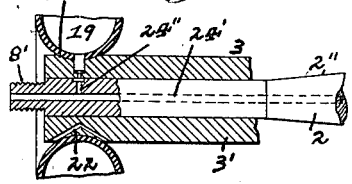
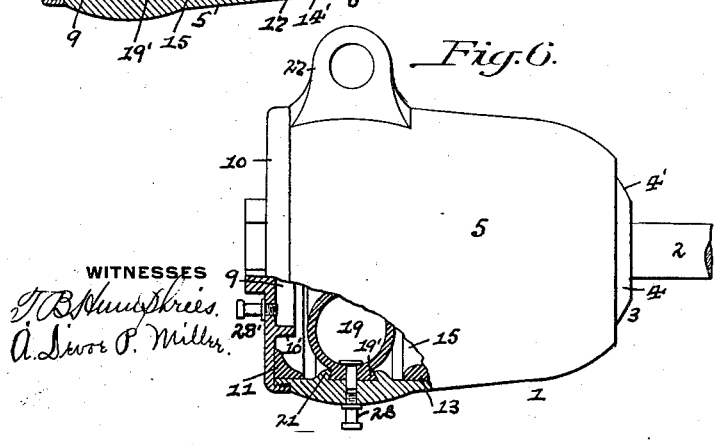
WITNESSES
T. B. Humphries.
A. Devor P. Miller.
INVENTOR
John T. Costello
By J. N. Cooke
Attorney.

UNITED STATES PATENT OFFICE.

JOHN T. COSTELLO, OF PITTSBURG, PENNSYLVANIA.

SHOCK-ABSORBER.

1,002,040.  Specification of Letters Patent.  Patented Aug. 29, 1911.

Application filed December 5, 1910. Serial No. 595,751.

*To all whom it may concern:*

Be it known that I, JOHN T. COSTELLO, a resident of Pittsburg, in the county of Allegheny and State of Pennsylvania, have invented a new and useful Improvement in Shock-Absorbers; and I do hereby declare the following to be a full, clear, and exact description thereof.

My invention relates to shock absorbers, and has special reference to such devices for use in connection with motor vehicles, such as automobiles.

The object of my invention is to provide a cheap, simple and efficient shock absorber which can easily and conveniently be applied to such vehicles, and when in use will tend to assist the springs of the vehicle in taking the shock from the body of the vehicle.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved shock absorber, I will describe the same more fully, referring to the accompanying drawings, in which—

Figure 1:
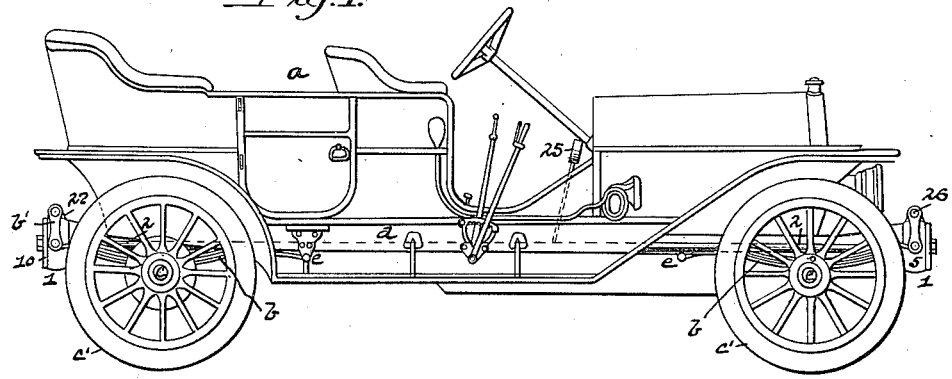
Figure 2:
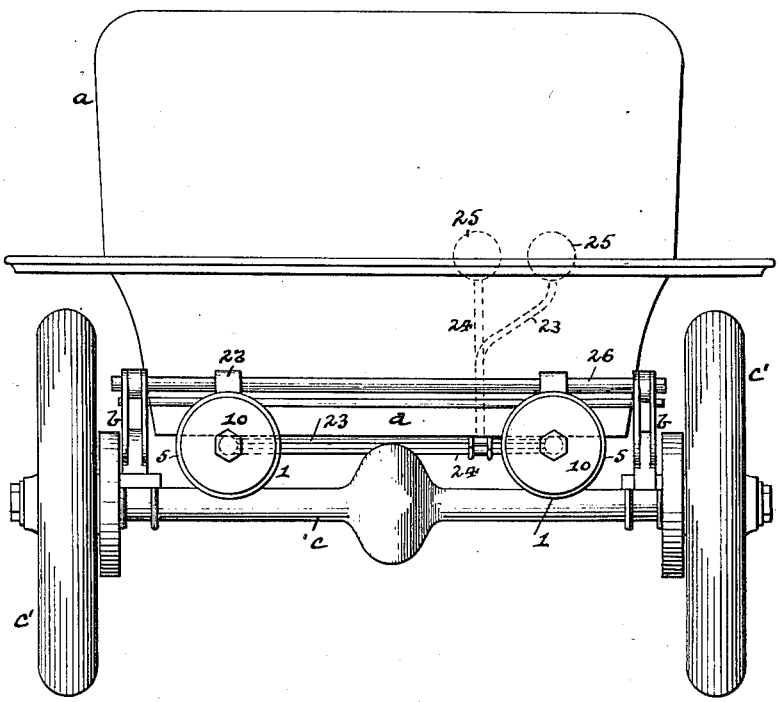

Figure 1 is a side elevation of an automobile showing my invention applied thereto. Fig. 2 is an enlarged rear view of said automobile. Fig. 3 is an enlarged side elevation of the rear portion of said automobile. Fig. 4 is an enlarged longitudinal central section of my improved shock absorber. Figs. 5 and 6 are detail sections showing other forms of the absorber.

Like symbols of reference herein indicate like parts in each of the figures of the drawings.

As illustrated in the drawings, *a* represents the ordinary approved form of an automobile, known as a touring car type, which has the usual springs *b* thereon for bearing against the axle *c* carrying the wheels *c'* and for being connected at their inner ends to the car body *d*, as at *e*, in the usual manner.

The shock absorbers are shown at 1, and each is connected to a transversely arranged stationary rod or shaft member 2 for supporting the same, which rods extend out from each side of the car body *d*, and are supported under said body in any suitable manner. Extending around each of the shafts 2 is a hub 3, which is positioned at the outer end of said shafts and is secured thereto by a key 2' engaging with the body portion 3' on said hub. The inner end of the hub 3 is provided with a shouldered portion 4, which extends out from the body portion 3' and is provided with a rounded outer face 4' thereon for engaging with a like face 5' on the inner face of the inclosing casing 5 to form a ball joint socket connection 6. Within the face 4' on the shoulder 4 is an annular recess 6' for the reception of a series of metal balls 7 which are adapted to be seated in a seat 6'' in said recess, and are provided with a retainer 7' thereon for holding such balls in said seat and in position for bearing against the face 5' on the casing 5, while the inner face on said shoulder is tapered as at 4'' for fitting against a tapered portion 2'' on the shafts 2, and a nut 8 engages with a threaded portion 8' on the outer end of said shafts to hold the hub 3 in place.

The casing 5 is adapted to form an air chamber 9 between the same and the hub 3, as well as around the outer end of said hub and its connecting shaft 2 when the screw-cap 10 is connected to the outer end of said casing, and such cap carries an annular packing ring 11 for fitting against the inner face of said casing to form an air tight connection for said chamber.

Within the chamber 9 and between the hub body 3', shoulder 4 and casing 5 is a packing block 12, preferably formed of rubber or other flexible material, which block is adapted to form an air tight connection between such parts and is provided with annular outer and inner flanges or cup-portions 13 extending outwardly therefrom into the said chamber for bearing respectively on the inner face of said casing and on the outer face of said hub body. The inner end 12' of the block 12 is provided with a tapered face 14 for fitting against a like face 14' on the shoulder 4 and the portions 13 on said block also form an air chamber 15 between the same, which is part of the chamber 9 on the inner side of the hollow tube hereinafter described. The block 12 is also provided with an annular opening 16 formed of a tapered portion 17 extending inwardly into the same from its outer wall and casing 5 and terminating within said block in a circular portion 17', which is formed in an enlarged portion 18 extending inwardly from the outer cup-portion 13 and connected to the inner wall 12' on said block, and by such block sufficient resiliency is permitted between said casing and the hub and enables the movement between said casing and hub through the ball joint connection 6.

Within the air chamber 9 and confined between the hub body 3' and casing 5 is the hollow tube 19, which is formed of the usual flexible material, such as rubber, and preferably of the clencher type of shoe, such shoe being adapted to form a pneumatic circular tube when in position and held within a grooved seat 20 in the outer face of said hub body and against said casing by the outwardly extending flanges 19' on said tube engaging with rims or lugs 21 on the inner face of said casing. An air passageway 22 is formed in the hub body 3' for communicating with the air chamber 9 on each side of the tube 19.

Air under pressure from any suitable source of supply on the automobile a can be admitted to the tube 19 through the passageway 23 in the shafts 2 and through the passageway 24 in said shafts to the chamber 9, such as is shown in Fig. 4, and a gage 25 can be connected to each of said passage-ways, as shown in Figs. 1 and 2 for indicating the pressure of the air in said tube and chamber.

When the parts of my improved shock absorber 1 are assembled together on each of the shafts 2, the outer ends of the springs b on each side of the automobile a are connected to such absorbers by a rod 26 engaging with said springs by a link b' and passing through an eye 27 formed on the outer face of the casings 5 on said absorbers. When air under pressure is admitted into the chamber 9 through the passage-way 24 and into the tube 19 through the passage-way 23, such air pressure within said chamber will be equal on both sides of said tube through the medium of the passage-way 22 connecting the compartments on each side of said chamber and circulating such air, so that in case of any shock to the automobile a through any obstructions on the street or highway coming in contact with the wheels c' thereof the shock will be imparted through said wheels, axle c, springs b, rod 26, and casing 5 and is absorbed by means of the air chamber 9 and tube 19 bearing against the fixed shaft 2. The casing 5 rocks upon the shoulder 4 of the hub 3 in its movement in taking up any such shocks by reason of the face 5' being free to move upon the balls 7 in said shoulder, and in case of any great shock coming upon the absorber 1, an annular ring 10' formed on the inner face of the cap 10 will strike the nut 8 on the outer end of the shaft 2 and thus prevent any further movement of said absorber relative to said shaft, as well as prevent any injury to the resilient tube 19 and block 12 of said absorber, while such block also confines the air within the chamber 9 and prevents the escape of the same between the faces 4' and 5' of the hub 4 and casing 5, respectively.

If desired, the chamber 9 and tube 19 can be fed with air from a single passage-way 24' in the shafts 2, such as is shown in Fig. 5, which leads to said chamber in the same manner as the passage-way 24 and has a branch 24" leading therefrom and through the hub body 3' into said tube. The chamber 9 and tube 19 can also be fed with air from any source of supply, such as is shown in Fig. 6, in which the usual valved connection 28 can lead through the casing 5 for such tube, and a like connection 28' can lead through the screw-cap 10 for such chamber.

Various other modifications and changes in the design and construction of my improved shock absorber may be resorted to, without departing from the spirit of the invention or sacrificing any of its advantages.

It will thus be seen that my improved shock absorber can be applied to other places on automobiles other than those shown and described, and it can be used on other objects and for other purposes, while the use of such a pneumatic device for taking up the shocks incident to automobiles and other objects will be of an air-balanced cushioning action, yet sufficiently resilient to take care of obstructions, rough places and imperfections in a street or highway in the way of motor vehicles. Sufficient air pressure can be maintained within and around the tube employed in the device in order to provide for the absorber being strong, durable and resilient, and also such tube is so positioned that it is not liable to become worn out or injured in any way on account of the same being inclosed and protected within the absorber, which will also protect such tube from blow-outs or punctures incident to these devices.

What I claim as my invention and desire to secure by Letters Patent is—

1. A shock absorber comprising a supporting member, an air tight casing around said member and forming a socket connection therewith, a resilient block between said member and casing having inner and outer annular flanges bearing against said member and casing, respectively, and a resilient tube between said member and casing having air under pressure within and around the same.

2. A shock absorber comprising a supporting member, an air tight casing around said member and forming a socket connection therewith, a resilient block between said member and casing having inner and outer annular flanges bearing against said member and casing, respectively, said block being provided with an opening at the socket end and extending inwardly into the same from said casing, and a resilient tube between said member and casing having air under pressure within and around the same.

3. A shock absorber comprising a supporting member, an air tight casing around said member and forming a socket connection therewith, a resilient block between said member and casing having inner and outer annular flanges bearing against said member and casing, respectively, a resilient tube between said member and casing having air under pressure within and around the same, and rims on said casing for engaging with flanges on said tube to hold said tube in place.

4. A shock absorber comprising a supporting member, a casing around said member, a resilient tube within said casing and around said member and having air under pressure within the same and within a chamber around said tube, which chamber is formed between said member and casing, said tube forming a compartment on each side of said tube, and means for circulating air in said chamber from one compartment to the other.

5. A shock absorber comprising a supporting member having a hub thereon, a casing around said hub, a resilient tube within said casing and around said hub and having air under pressure within the same and within a chamber around said tube, which chamber is formed between said hub and casing, said tube forming a compartment on each side of said tube, and a passage-way in said hub for circulating the air from said chamber from one compartment to the other.

6. A shock absorber comprising a supporting member, an air tight casing around said member and forming a socket connection therewith, a resilient block between said member and casing having inner and outer annular flanges bearing against said member and casing, respectively, a resilient tube between said member and casing having air under pressure within and around the same, and passage-ways within said member for supplying the air to said tube and around the same.

7. A shock absorber, comprising a supporting member, an air tight casing around and having a movable connection with said member, and a resilient tube between said member and casing having air under pressure within and around the same.

8. A shock absorber, comprising a supporting member, an air tight casing around and having a movable connection with said member, and a resilient tube between said member and casing having air under pressure within the same and within a chamber on each side of said tube.

9. A shock absorber, comprising a supporting member, an air tight casing around and having a movable connection with said member, and a resilient tube between said member and casing having air under pressure within the same and within a chamber on each side of said tube, which chamber is formed between said member and casing.

10. A shock absorber, comprising a supporting member, an air tight casing around and having a movable connection with said member, a resilient tube between said member and casing having air under pressure within and around the same, and a resilient block between said member and casing.

11. A shock absorber, comprising a supporting member, an air tight casing around and having a movable connection with said member, a resilient tube between said member and casing having air under pressure within and around the same, and a resilient block between said member and casing having inner and outer flanges for bearing against said member and casing respectively.

12. A shock absorber, comprising a supporting member, an air tight casing around and having a movable connection with said member, a resilient tube between said member and casing having air under pressure within and around the same, and means for holding said tube in position.

13. A shock absorber, comprising a supporting member, an air tight casing around and having a movable connection with said member, a resilient tube between said member and casing having air under pressure within and around the same, and means on said member for holding said tube in position.

14. A shock absorber, comprising a supporting member, an air tight casing around and having a movable connection with said member, a resilient tube between said member and casing having air under pressure within and around the same, and means on said casing for holding said tube in position.

15. A shock absorber, comprising a supporting member, an air tight casing around and having a movable connection with said member, a resilient tube between said member and casing having air under pressure within and around the same, and means for supplying air to said tube and around the same.

16. A shock absorber, comprising a supporting member, an air tight casing around and having a movable connection with said member, a resilient tube between said member and casing having air under pressure within the same and within a chamber on each side of said tube, and means for circulating air from one of said chambers to the other.

In testimony whereof, I, the said JOHN T. COSTELLO, have hereunto set my hand.

JOHN T. COSTELLO.

Witnesses:
    JAMES L. WEHN,
    J. N. COOKE.